INVENTORS.
INGVAR OSKAR WALLENTIN LUNDIN
and SVEN AXEL ERIKSSON

ATTORNEY.

Sept. 23, 1969  I. O. W. LUNDIN ET AL  3,468,419
PROCESS AND MEANS FOR FILTRATION OF YEAST OR OTHER
PLANT CELLULAR MATERIAL
Filed June 8, 1966
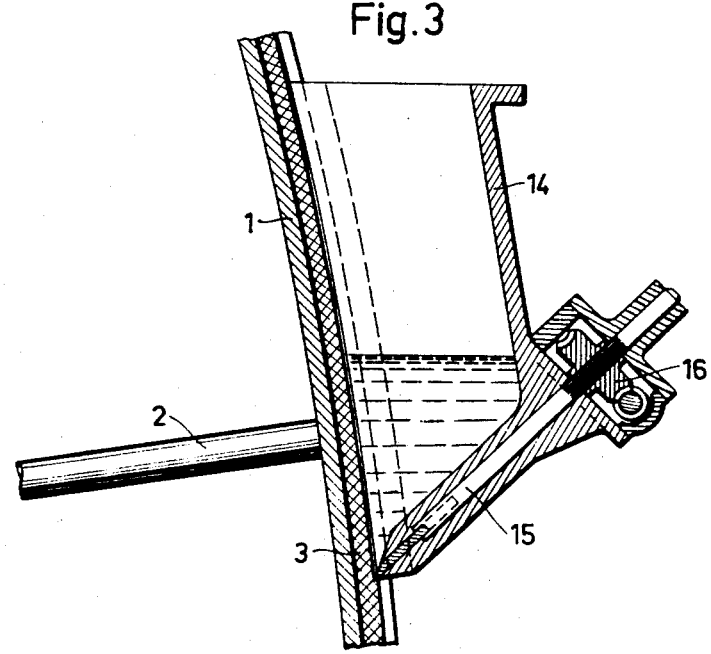
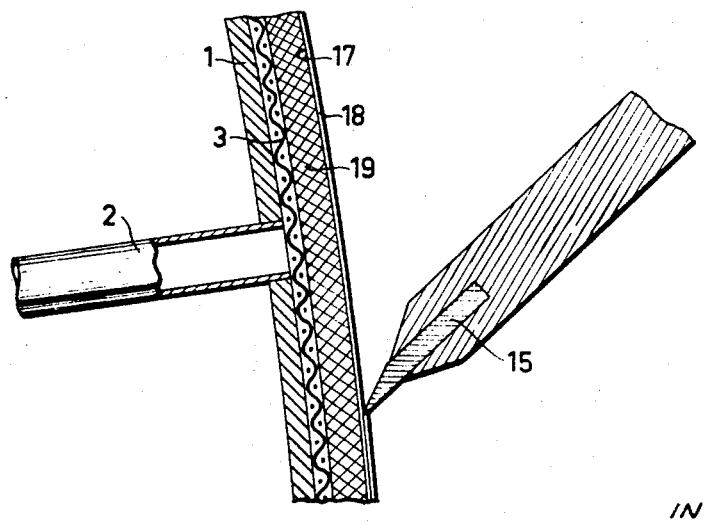
INVENTORS.
INGVAR OSKAR WALLENTIN LUNDIN
and SVEN AXEL ERIKSSON
ATTORNEY.

United States Patent Office 3,468,419
Patented Sept. 23, 1969

3,468,419
PROCESS AND MEANS FOR FILTRATION OF YEAST OR OTHER PLANT CELLULAR MATERIAL
Ingvar Oskar Wallentin Lundin, Norrviken, and Sven Axel Eriksson, Sodertalje, Sweden, assignors to Svenska Jastfabriksaktiebolaget, Stockholm, Sweden, a Swedish corporation
Filed June 8, 1966, Ser. No. 556,170
Claims priority, application Sweden, June 8, 1965, 7,527/65
Int. Cl. B01d 37/00
U.S. Cl. 210—67                                    7 Claims

ABSTRACT OF THE DISCLOSURE

Yeast or other plant cellular material in suspension on a rotating drum suction filter is applied to the drum immediately above a doctor knife. The drum turns one full revolution to bring the suspension to the knife, thus utilizing substantially the entire peripheral surface of the drum for filtering.

---

Figure 1:
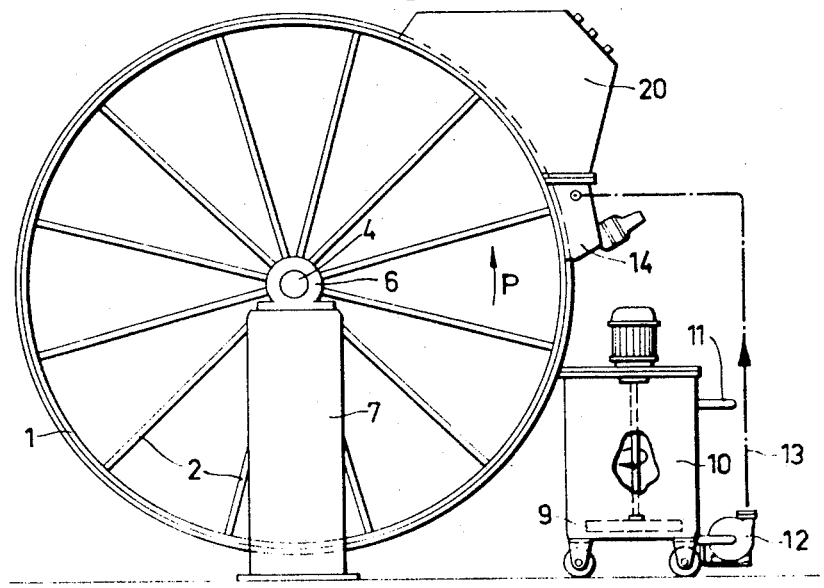

In filtration of yeast, for instance bakeries' yeast on rotating vacuum filters or pressure filters it is known in certain cases to effect the filtration on textile filter cloths or cloths of artificial fibre material without auxiliary filtering agents. In other cases, particularly when the yeast is difficult to filter and rapidly will clog the filter-cloth so that filtration through the filtering material is prevented or ceases there are used auxiliary filtering agents such as, for example, starch, diatomaceous earth or the like. This auxiliary filtering agent may be applied to the filter cloth directly or on a fine-mesh metal wire gauze. This application of so-called precoating agent may be effected periodically or continuously during each rotation of the rotating filter.

It is also known to apply the auxiliary filtering agent by suspending it in an application trough below a dewatering apparatus so that the filter drum will rotate through this suspension. Applying of auxiliary filtering agent may also be effected by spraying the suspension by means of spraying tubes in a particular application box which is arranged on the drum directly. The yeast suspension to be filtered is supplied to the dewatering apparatus in a trough which is positioned below the drum and into which the rotating filter drum with or without auxiliary filtering agent will emerge continuously. The filtered yeast will be removed from the drum by means of a separate doctor knife. In order to equalize the thickness of the yeast layer and to control the quantity of yeast on the drum during the filtration there is a particular doctor knife, a so-called equalization doctor knife, arranged immediately above the liquid surface in the trough. In filtration with continuous scraping off of the auxiliary filtering agent together with the yeast the diameter of the filter drum is reduced successively so that by spring bias or a counter weight system the equalization doctor knife will be caused to adjust itself after the change of the diameter of the filter surface.

The process according to the present invention is mainly characterized by the fact that the suspension as well as the auxiliary filtering agent, when the latter is used, are applied to the filter by means of a common application box or the like the bottom of which is constituted by a preferably movable doctor knife or other scraping off means adapted to remove the precipitated layer on the surface of the filter, for the purpose of utilizing as much of the periphery of the filter surface for the filtration as possible. Applying of the auxiliary filtering agent is effected periodically and during this application of the auxiliary filtering agent the movable knife forming the bottom of the application box will be moved gradually from its innermost position either by means of a driving motor or manually. The speed of motion of the knife outwards is adjusted so as to allow a thin layer of freshly applied auxiliary filtering agent to be scraped off continuously for each rotation and to be returned to an auxiliary filtering agent container arranged below the doctor knife. Due to this gradual movement of the knife no leaking will occur between the filter surface and the knife.

On filtration of the yeast the knife will be moved slowly by means of a driving motor or manually from its extreme position continuously through the auxiliary filter agent layer which when starting the filtration may have a thickness of say about 20 to 25 mm. and at the completion of the filtration may for example be about 3 to 5 mm.

Due to the fact that the knife forms the bottom of the application box the circumference of the filter will be utilized completely (100%) whereby air leakage through the filter surface will be reduced and the effective filter surface and the drying time will be increased to a maximum.

Since application of the yeast and the auxiliary filtering agent preferably is effected somewhat above a horizontal plane through the central axis of the drum as viewed in the direction of rotation of the drum, the quantities of water sucked off in a filter of the spoke type will be discharged under the action of its own pressure towards the central axis during the half rotation of the drum subsequent to the application, so as to contribute to increasing the vacuum produced by means of the vacuum pump in the interior of the drum. In filter without spokes, such as of the hollow space type, the filtrate and washing water are removed and collected at the bottom of the drum by means of siphon tubes or vanes in a known manner.

In washing of the yeast spraying of water is effected immediately after the application of yeast and also this water which is mixed with the filtrate in the spokes contributes to increasing this effect.

By the application of yeast in the application box onto one side of the drum the angle of application may be reduced to a minimum and the application of yeast may be effected during a very short period of application. The angle of application may vary between 2° and 10° and the application time may vary between 0.01 second and 0.2 second, depending on the speed of rotation and the diameter of the drum. By using an application box between the supporting edges for the layer of auxiliary filtering agent the filter surface may be divided into two or more sections which may operate quite independently of each other. By dividing the filter surface into two or more sections which may operate independently of each other it is possible on the same filter to filter yeasts of different qualities and having different contents of dry substances in the yeast obtained, for example by control of vacuum or by varying addition of electrolyte in known manner. In such a division a vacuum pump is arranged at each end of the filter shaft and the central shaft is provided with valves or lids which close the section of the drum on which no filtration takes place.

Figure 2:
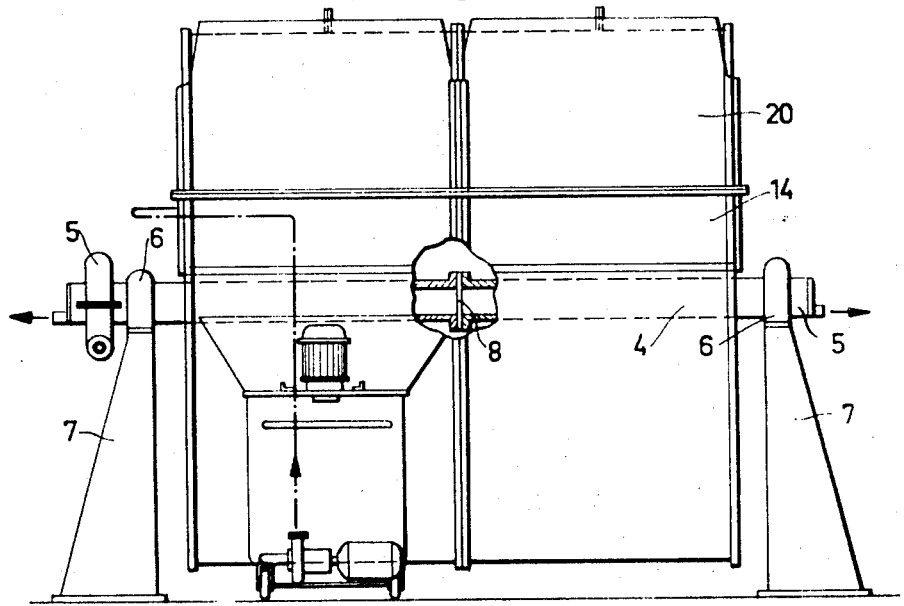

One embodiment of a device for performing the method according to the invention is shown on the accompanying drawings in which FIG. 1 illustrates an end view of a rotating vacuum filter according to the invention;

FIG. 2 a side view thereof;

FIG. 3 shows on a larger scale a vertical section of the doctor's knife with associated application box; and FIG. 4 the doctor knife in a still larger scale.

The filter rotating in the direction P of the arrow shown in FIG. 1 consists of a filter drum 1 with tubular radial spokes 2 extending from the circumferential filter surface of the drum divided into sections and having draining nets 3 (FIGS. 3 and 4) to a central shaft 4 of the drum. The spokes serve the double purpose of carrying the filter surface and connecting the filter surface to a source of vacuum so as to expose the filter surface to the action of internal suction during the filtration. To this purpose the hollow rotational shaft 4 journalled in bearings 6 on supports 7 is connected to a vacuum pump 5 at one end or, as shown, at both ends, but also some other type of source of vacuum may be utilized. Each tubular spoke 2 extends from the hollow shaft to a section of the filter surface. The central shaft 4 is provided with valves or lids 8 which in known manner make it possible to shut off the sections of the filter surface which actually are not in function for suction filtration, from those sections at which filtration takes place.

Auxiliary filtering agent or so-called precoating agent, for example consisting of starch, diatomaceous earth or the like is supplied through a conduit 11 into a mixing apparatus 10 provided with an agitator 9, and is fed by means of a pump 12 and a conduit 13 into an application box 14, the bottom of which is defined by a doctor knife 15 or any similar scraping off means. The application box is arranged adjacent to a portion of the periphery of the filter surface, for example embracing an arc of 2 to 10°. Application of the auxiliary filter agent is effected periodically at desired time intervals. During this application the knife 15 will be moved gradually from the filter surface while scraping off the external layer of auxiliary filtering agent deposited onto the filter surface and leaving the desired thickness of layer of auxiliary filtering agent on the surface of the filter. The mixing apparatus 10 is preferably positioned directly below the application box 14 with its knife 15 so that excess of auxiliary filtering agent at the scraping off procedure will fall down directly into the mixing apparatus for new circulation.

By means of a power or manual driving mechanism 16 the knife 15 is movable in the direction towards and from the filter surface. In applying auxiliary filtering agent as now described the knife 15 will be moved outwards gradually until a desired layer 19 of auxiliary filtering agent has been obtained. This application is effected periodically, that is to say, when during the filtration the auxiliary filtering agent has been scraped off too much or in other respects has been deteriorated, necessitating the application of a new layer of auxiliary filtering agent in the manner now described.

After having applied the necessary thickness of layer of the auxiliary filtering agent which rests on the filter net 17, the suspension to be filtered is supplied to the application box 14 and caused to deposit as a layer 18 onto the auxiliary filtering layer. The knife 15 is now displaced inwards towards the filter surface so as to scrape off the desired thickness of layer 18, if desired, together with the extreme layer of auxiliary filtering agent 19.

A washing apparatus 20 is provided after the application box 14 as viewed in the direction P of rotation. This apparatus for example operates by spraying of water or other washing liquid so as to wash the deposited layer 18. The latter is subsequently sucked off during the continued rotation of the filter drum toward the knife 15.

The invention with its application box 14 may also be applied in the case that no auxiliary filtering agent is used.

It will be seen from the drawing that the application box and a washing apparatus arranged after the box in the direction of rotation of the filter are arranged immediately above a horizontal plane through the rotational shaft of the filter, viewed in the rotational direction of the filter, whereby during half a rotation of the filter the filtrate, if desired, together with the washing waters is caused to drop towards the central shaft and by the spout pipe action in the use of so-called spoke filters contributes to increasing the vacuum in the filter produced by vacuum pumps, for example. Moreover, across the width of the filter the filter surface and the application box may be divided into two or more sections which operate independently of each other in controlling the filter capacity and the distribution of the filtered mass.

What we claim is:

1. A process for filtration of yeast or other plant cellular suspension on the outer circumferential surface of a rotatable suction filter drum comprising the steps of: applying the suspension from an application box to said surface, rotating the drum, and removing an applied layer of said suspension from the surface after it has been carried through substantially 360° by the rotation of the drum by means of a doctor knife positioned immediately before the position at which said suspension is applied when considered in the direction of rotation of the filter drum, said application box being positioned at a level above the center of said drum and extends along a circumferential length equivalent of from 2°–10° of the circumferential surface of the drum.

2. The process of claim 1 including periodically displacing the knife outwards from the drum surface and simultaneously applying an auxiliary filtering agent from said application box to said surface to underlie said suspension.

3. The process of claim 2 wherein said auxiliary filtering agent is applied to a thickness of from about 20 to 30 mm.

4. The process of claim 2 wherein as said layer is removed the knife is displaced inwardly toward the drum surface thus removing a quantity of said auxiliary filtering agent together with said layer.

5. The process of claim 1 including the step of washing the applied suspension by spraying washing fluid on to the applied suspension on the drum surface before removing the layer.

6. An apparatus for the filtration of yeast or other plant cellular suspension comprising: a rotatable filter drum having an outer circumferential surface, an application box positioned adjacent the outer circumferential surface for applying said suspension to the drum surface, and a doctor knife positioned adjacent said surface and immediately before said application box when considered in the direction of rotation of the drum, said application box being positioned at a level above the center of said drum and extends along a circumferential length equivalent of from 2°–10° of the circumferential surface of the drum.

7. Apparatus according to claim 6 wherein said doctor knife constitutes the bottom of said application box.

References Cited

UNITED STATES PATENTS

| | | | |
|---|---|---|---|
| 1,449,774 | 3/1923 | Najarian | 210—217 |
| 1,946,039 | 2/1934 | Staritzky | 210—75 |
| 2,073,384 | 3/1937 | Barnebl | 210—402 X |
| 2,102,780 | 12/1937 | Bielfeldt | 210—75 |
| 2,270,938 | 1/1942 | Doescher | 210—396 X |
| 2,576,288 | 11/1951 | Fink et al. | 210—75 |
| 2,602,549 | 7/1952 | Peterson | 210—193 |
| 3,027,011 | 3/1962 | Flynn | 210—404 |

SAMIH N. ZAHARNA, Primary Examiner

U.S. Cl. X.R.

210—75, 77, 396, 402